(12) United States Patent
O'Martin et al.

(10) Patent No.: US 7,949,613 B2
(45) Date of Patent: May 24, 2011

(54) APPARATUS FOR IMPROVED SORTATION AND DELIVERY POINT PROCESSING OF MILITARY MAIL

(75) Inventors: Alan O'Martin, Coppell, TX (US); Robert Fisher, Arlington, TX (US); Carlos Macia, Plano, TX (US); Wayne Sipe, Mansfield, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 1741 days.

(21) Appl. No.: 10/429,194

(22) Filed: May 2, 2003

(65) Prior Publication Data

US 2004/0220888 A1 Nov. 4, 2004

(51) Int. Cl.
*G06Q 30/00* (2006.01)
*G06F 17/30* (2006.01)

(52) U.S. Cl. ........ 705/338; 705/330; 705/332; 707/758; 707/803

(58) Field of Classification Search ............... 705/1, 1.1, 705/330–333, 337–338; 707/758, 803
See application file for complete search history.

(56) References Cited

U.S. PATENT DOCUMENTS

| 4,117,975 | A | 10/1978 | Gunn ........................... 235/494 |
| 5,005,124 | A | 4/1991 | Connell et al. ................ 364/401 |
| 5,079,714 | A | 1/1992 | Manduley et al. ............ 364/478 |
| 5,278,955 | A | 1/1994 | Forte et al. .................... 395/200 |
| 5,422,821 | A | 6/1995 | Allen et al. ................... 364/478 |
| 5,673,193 | A | 9/1997 | Brust et al. ............... 364/464.16 |
| 5,944,787 | A | 8/1999 | Zoken .......................... 709/206 |
| 6,233,565 | B1 * | 5/2001 | Lewis et al. ..................... 705/35 |
| 6,370,567 | B1 | 4/2002 | Ouchi .......................... 709/206 |
| 6,457,012 | B1 * | 9/2002 | Jatkowski ..................... 707/758 |
| 6,549,892 | B1 * | 4/2003 | Sansone ........................ 705/401 |
| 6,711,555 | B1 * | 3/2004 | Sanders ........................ 705/406 |
| 6,741,724 | B1 * | 5/2004 | Bruce et al. .................... 705/402 |
| 2002/0049815 | A1 * | 4/2002 | Dattatri ........................ 709/206 |
| 2003/0014375 | A1 * | 1/2003 | Hoffmann et al. ............ 705/404 |
| 2003/0088426 | A1 * | 5/2003 | Benson et al. .................... 705/1 |
| 2003/0109954 | A1 * | 6/2003 | Daniels et al. ................ 700/226 |
| 2003/0114955 | A1 * | 6/2003 | Daniels, Jr. ................... 700/224 |
| 2003/0208370 | A1 * | 11/2003 | Wilson et al. ..................... 705/1 |
| 2004/0093222 | A1 * | 5/2004 | Sipe et al. ........................ 705/1 |
| 2004/0207867 | A1 * | 10/2004 | Stringham .................. 358/1.15 |

OTHER PUBLICATIONS

DoD 4525.6-M, Department of Defense Postal Manual, Aug. 15, 2002, 260-291, full text available at http://www.dtic.mil/whs/directives/corres/pdf/452506m.pdf.*
Military Mail Solutions, Inc. Generates Approximately One Million New Customers for the World Wide Web, Oct. 16, 2000, Business Wire (Dialog copy).*

* cited by examiner

*Primary Examiner* — Daniel Vetter
(74) *Attorney, Agent, or Firm* — Filip A. Kowalewski

(57) ABSTRACT

A method for distributing military mail includes the steps of compiling military unit and associated delivery code information into a computer searchable military address management system database which associates a military unit zip code with a current geographic location for that unit; obtaining military unit personnel change of address information from a number of sources including a national change of address database maintained by a federal postal service and input from a military unit to which a military mail recipient belongs, which information is compiled into a computer searchable military change of address database, which information includes change of address information more recent than change of address information reflected in a federal national change of address database; and using information from the military address management system database and the military change of address database to redirect incorrectly addressed mail pieces to a military mail recipient's current address.

9 Claims, 11 Drawing Sheets

MCOA Database 76

| NAME | Grade | Unit | Mail Addr. | ZIP | LOC. | Effective Date |
|---|---|---|---|---|---|---|
| Jones, J. | 1Lt | V Corps | Unit 29355 | 09014 | Germany | 1-Jan-2002 |
| Jones, J. | 1Lt | USASETAF Camp Darby | UNIT 31401 BOX 5 | 09630 | Italy | 15-Jan-2002 |
| | | | | | | |
| | | | | | | |

Figure 6

APPARATUS FOR IMPROVED SORTATION AND DELIVERY POINT PROCESSING OF MILITARY MAIL

TECHNICAL FIELD

This invention related to mail sorting and distribution, particularly to systems for determining when mail should be forwarded to a new address.

BACKGROUND OF THE INVENTION

The United States Postal Service (USPS) handles a large volume of mail addressed to U.S. military personnel stationed both within the Continental United States (CONUS) and Outside the Continental United States (OCONUS). Mail delivery to military personnel is a difficult process. Military mail addresses do not have the standard name, street, city, state, format commonly used by the USPS. Physical delivery is difficult because military units/service members change locations frequently. Under the existing system, OCONUS mail is routed through the USPS to collection sites currently located at the San Francisco (SF) mail terminal, New York (JFK) mail terminal, and Miami (MIA) mail terminal. Each of these sites receives mail for a number of preassigned special military ZIP codes.

At these sites, military and U.S. Postal Service personnel provide further sortation and transportation of mail to military personnel overseas. Mail at each site is sorted, packaged and then shipped generally by plane to a distribution point associated with the military ZIP code. The sorting process uses a ZIP code sort plan that limits the number of address locations and provides only a coarse level of destination sorting. A finer level of destination sorting is accomplished by the military at the destination distribution points. Military personnel on site aid the USPS in determining where to ship the mail. For example, a large naval vessel such as an aircraft carrier receives a large number of mail pieces, but the ship may be anywhere in the world. The U.S. military tracks these movements and advises the USPS where to ship mail sorted for a given ship. At various military destination sites overseas, one of which is Tokyo, the mail is delivered to the U.S. military which then distributes it further to specific units and individual servicemen.

Mail forwarding procedures in use by the U.S. military are inefficient. Mail addressed to a serviceman who has moved is most often delivered to the old address/unit. One member of that unit, responsible for mail distribution (mail clerk), marks it with forwarding information and re-introduces it into the USPS mail stream, after which it is sent again to one of the USPS collection sites and sent on. USPS change of address forms are provided by the USPS, but seldom are used in a timely manner. Due to the high mobility of military personnel, as much as a third of all military mail is incorrectly addressed and must be forwarded to the service member's new address. During contingencies, the location of military personnel is frequently unknown at the collection sites, for a variety of reasons.

Military CONUS destined mail is handled through standard U.S. Postal Service methods and procedures. Mail for military CONUS locations is delivered, without going through the USPS military mail centers, to a military mail facility at each military installation. This mail is only sorted to the level required to deliver the mail to the installation level, usually a 5-digit ZIP code. No provisions are made to further process this mail to a finer depth or sort, or to account for military change of addresses. Military CONUS mail final destination sortation and delivery is accomplished manually using known methods at each military installation.

Relatively little effort has been directed to improving postal mail forwarding procedures. Allen et al. U.S. Pat. No. 5,422,821 describes one mail forwarding system wherein mail piece addresses and bar codes are scanned and checked against a forwarding address database so that forwarding to the new address can occur without first sending the mail piece to the old address. However, the system described by Allen does not address the special problems presented by forwarding of military mail.

Commonly-owned U.S. patent application Ser. No. 10/290,029, filed Nov. 7, 2002, the contents of which are incorporated by reference herein for all purposes, describes a system for creating a change of address database more current than the USPS NCOA database, but again does not address special problems presented by forwarding of military mail.

SUMMARY OF THE INVENTION

The present invention seeks to improve the effectiveness of sortation and delivery point processing of military mail on behalf of the U.S. military. According to one aspect of the invention, a method for distributing military mail includes the steps of: (a) compiling military unit and associated delivery code information into a computer searchable military address management system database which associates a military unit zip code with a current geographic location for that unit; (b) obtaining military unit personnel change of address information from a number of sources including a national change of address database maintained by a federal postal service and input from a military unit to which a military mail recipient belongs, which information is compiled into a computer searchable military change of address database, which information includes change of address information more recent than change of address information reflected in a federal national change of address database; and (c) using information from the military address management system database and the military change of address database to redirect incorrectly addressed mail pieces to a military mail recipient's current address. For purposes of the invention, "military" refers to any government organization wherein its members are assigned to units and have mail delivered to them partly by means of internal distribution after receipt from a federal postal service.

A corresponding system for distributing change of address information more current than a master postal change of address database includes the computer searchable military address management system database, the computer searchable military change of address database, and suitable means such as described hereafter for using information from the military address management system database and the military change of address database to redirect incorrectly addressed mail pieces to a military mail recipient's current address and/or make such information available to military personnel or other non-military customers.

The invention further provides a method for delivering military mail outside the United States. Such a method includes an initial step of receiving mail addressed to military personnel at addresses outside the United States through the U.S. Postal Service. Such mail is collected at a plurality of collection centers, e.g. those operated by the U.S. Postal Service, which collection centers are each designated to receive mail for one or more overseas military postal codes. At some point control of such mail at each center is transferred to a private service bureau either associated with a USPS collection center or taking its place. In the latter case, there will preferably one service bureau for each collection center. The service bureau determines if each piece of mail should be forwarded to a different destination than one to which it was originally addressed, as indicated by military unit location determined from a military address management system database and location of a military recipient determined from a military change of address database. Mail to be forwarded is then sorted into groups according to the designated collection center for the different destination, and each group of mail to be forwarded is transferred to its designated collection center for each group. Mail from each collection center is then transported to one or more predetermined locations for delivery to a branch of the military for distribution to military personnel outside the United States. These and other aspects of the invention are described in further detail hereafter.

BRIEF DESCRIPTION OF THE DRAWINGS

In the accompanying drawings:

FIG. 6 is a schematic diagram showing an example of military change of address (MCOA) database elements according to the invention;

DETAILED DESCRIPTION

Figure 1:
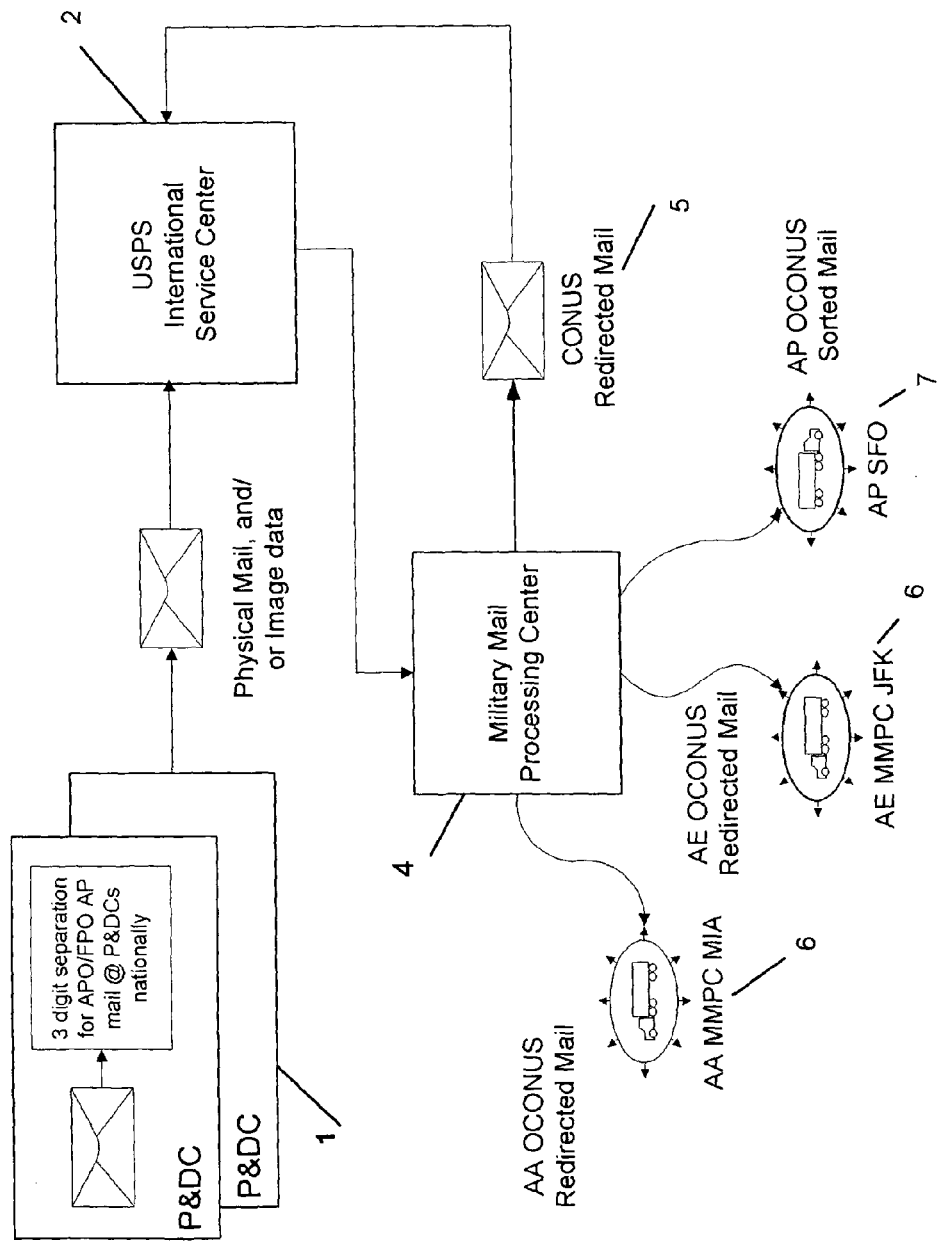
FIG. 1 is a schematic diagram of military mail flow according to one embodiment of the invention.

FIG. 1 shows the proposed method for processing military mail. Mail (not limited to letter class mail) destined to Outside Continental United States (OCONUS) military locations is sorted to 3 digits and transferred by United States Postal Service (USPS) Production & Distribution Center (P&DC) sites 1 to designated USPS collection sites 2 for further processing, where it is sorted to 5 digits. There are currently three USPS centralized International Service Centers (ISC) 2 that service the primary military theaters of operation. The San Francisco (SFO) ISC services the Armed Forces Pacific (AP) theater, the New York (JFK) ISC services the Armed Forces Europe (AE) theater, and the Miami (MIA) ISC services the Armed Forces Americas (AA) theater. Mail is then transferred to the Military Mail Processing Center (MMPC) 4 for final sorting and distribution. The MMPC 4 processing will determine change of address mail (mail that will be forwarded), and apply new address labels. MMPC 4 will also sort the mail in sequence down to the unit and service member level using 9 or 11 digit military ZIP codes. Mail processed at the MMPC can fall into 4 categories. In this example, mail originating from the USPS collection site 2 is always addressed to AP (Pacific) destinations. During the mail processing at the MMPC, a determination is made if the mail item is being forwarded. Mail could be forwarded to other MMPC locations 6, for example AA (Americas) or AE (Europe). In addition, mail could be forwarded within the CONUS 5, and in this case the mail is returned to the USPS site 2 for processing. All other mail does not require forwarding and is sent to the AP OCONUS logistics hub 7.

Figure 2:
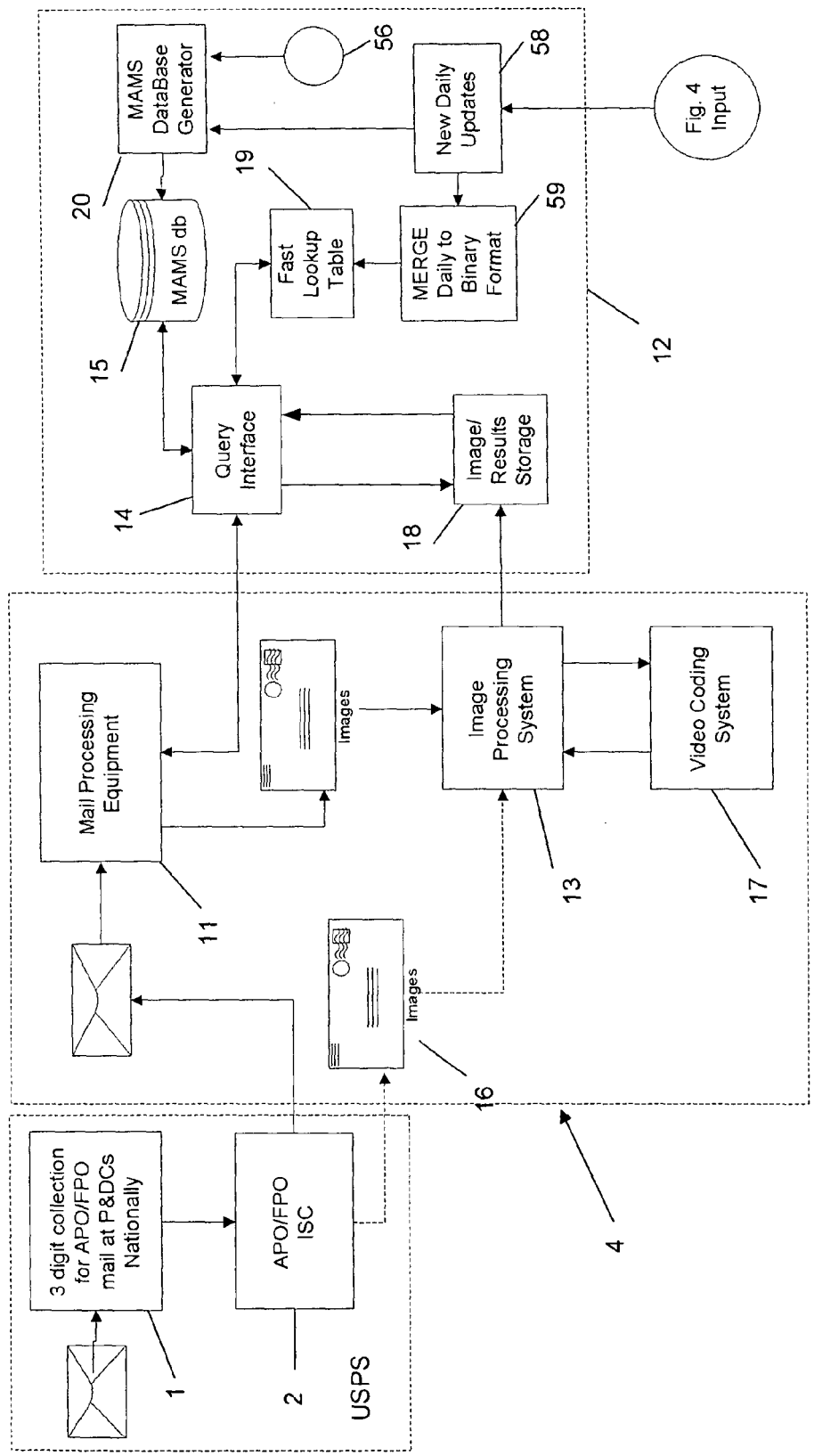
FIG. 2 is a schematic diagram of Military Mail Automated Processing System (MMAPS) system architecture according to the invention.

A typical MMPC 4 is shown in FIG. 2. The mail flow originates at the USPS P&DC sites 1 and enters the USPS ISC military mail centers 2. Automated mail processing equipment (MPE) at center 2 sorts the mail to a 3- or 5-digit sort level, and the USPS then delivers the mail to the MMPC 4. Automated mail processing equipment 11 at MMPC site 4 processes the mail using forwarding information obtained from the MMAPS server 12 to correctly address mail to units and individuals using the Military Address Management System (MAMS) 41 to be described hereafter. One embodiment of this invention allows the operation of transportable MMPC's serving local installations, to sort and distribute military mail locally on base.

The MPE equipment 11, such as a DIOSS or MLOCR mail sorting machine, scans each mail piece to determine address and addressee information using techniques common in the art. From the scanned data, OCR logic attempts to determine the addressee and address information. The decoded information is sent to the MAMS database server 12 via a query interface 14. When the OCR logic running on machine 11 is not able to decode OCR data, the image and an associated identification tag is sent to an Image Processing System (IPS) 13 that stores the image data, presents the data to an operator for human analysis, and then stores the results.

Successful OCR results in MPE 11 will generate queries to the MAMS database server 12 to determine if the addressee/address data constitute a forwarding candidate. Query interface 14 first performs a search in a fast lookup table 19. The fast lookup table 19 contains only the most recent change of address information, whereas the MAMS database 15 contains the entire military address database, which is generated on a less frequent basis. If a hit is found on the fast lookup table, that information is used and a search of database 15 is not necessary. The MAMS database 15 contains the entire military change of address data.

This database may have associated access routines that make up for deficiencies in the search data elements. Such missing data would normally prevent accurate address determination. As is often the case in addressing mail, important information is frequently abbreviated or key words are omitted when describing an address, for example the hand written address, "J Jones, DDG 41, FPO (Fleet Post Office), AP", is more accurate when written "Seamen James E Jones, USS Alabama, DDG 441, FPO, AP, 96306-1234". This database preferably contains correlation routines that will interpret the missing or incorrect data elements, make the appropriate substitutions and present to the query interface a military delivery point ZIP Code that is associated with the service member and address query. In particular, prior to searching, the address information may be standardized to the format of the database to ensure a more accurate result.

If automated OCR and/or bar code scanning methods fail to produce results, an identification tag is printed on the mail piece and the image data and tag code are sent to IPS 13. There the data is stored and queued for analysis by a Video Coding System (VCS) 17. VCS 17 allows a human operator to view the address images at a video coding computer terminal. The video coding computer operator interprets the address image and associates a 9- or 11-digit ZIP code with that data. The IPS system 13 then sends these results to an image results storage file or table 18 on MAMS database server 12 for storage and later retrieval by the query interface 14. The non-OCR mail is processed at a later time (to allow for the video coding analysis) on MPE 11. During this process, the mail piece's identification tag code is sent to query interface 14. Query interface 14 searches a stored image results file or table 18 for the identification tag code and associated results generated by IPS 13. This data is then returned to the MPE 11 to enable further processing, i.e., sorting and labeling. Should an MPE query not obtain a result because the video coding was not successful, then the mail piece is rejected for manual processing using techniques well known in the art.

Figure 3:
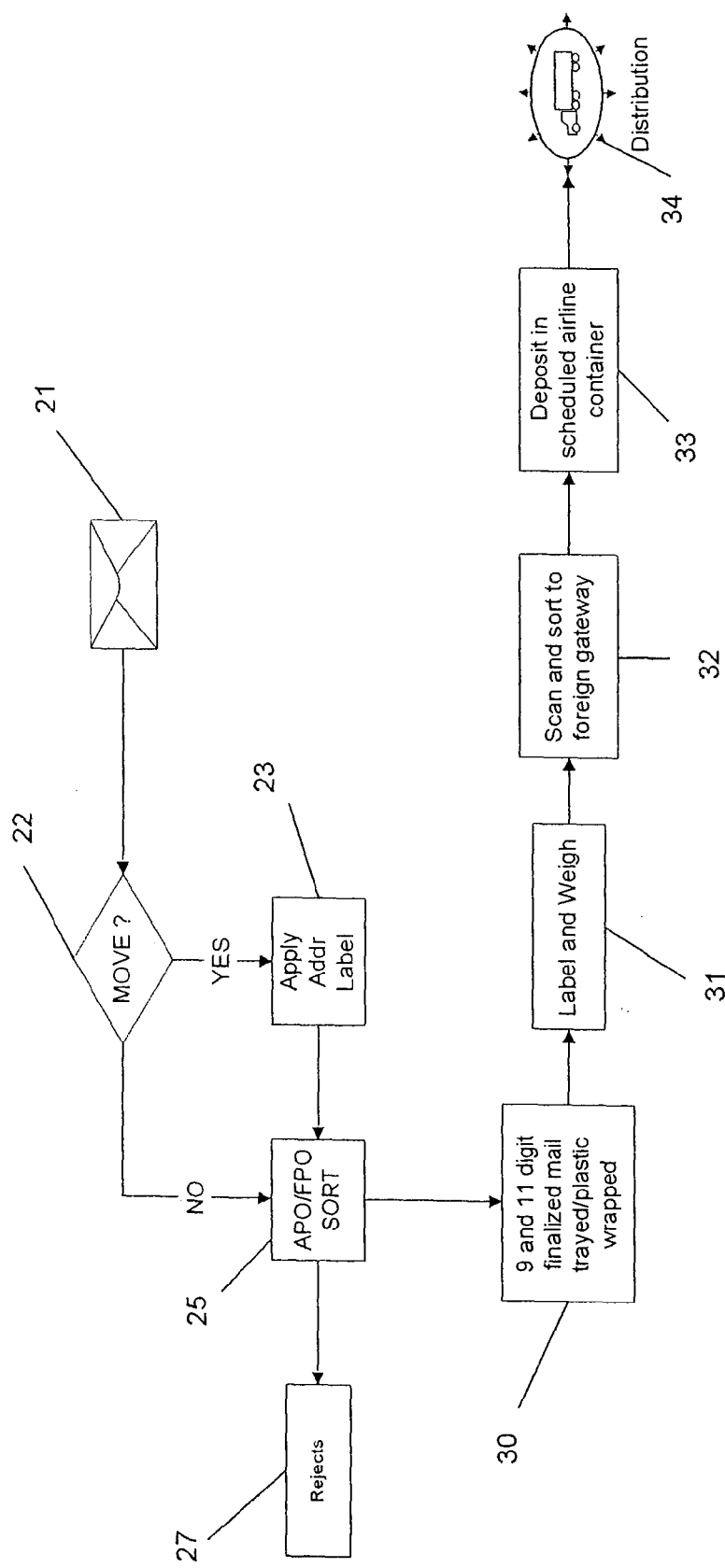
FIG. 3 is a schematic diagram of an MMAPS distribution process.
Figure 8:
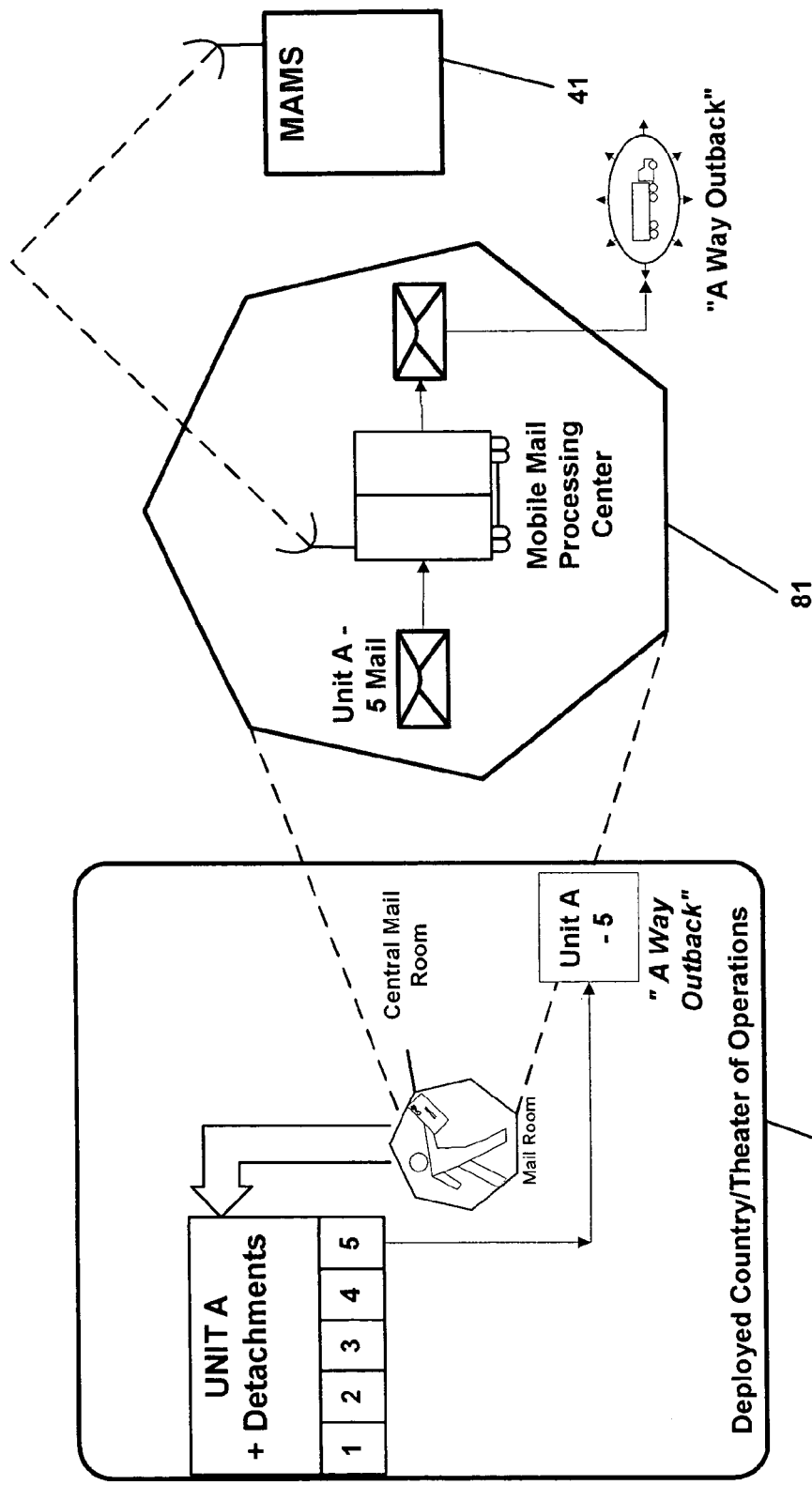
FIG. 8 is a schematic diagram showing an example of "In theater" mail distribution according to the invention.
Figure 9:
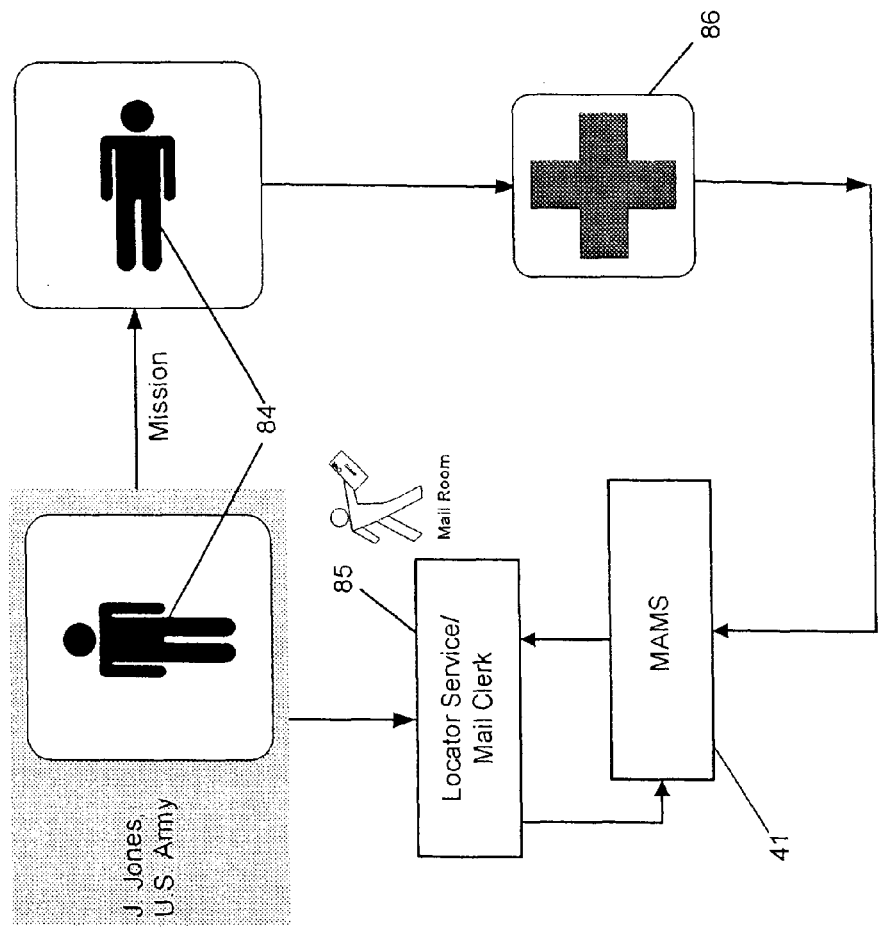
FIGS. 9 and 10 are schematic diagrams showing examples of individual member movements and how they are tracked in the MCOA database.
Figure 10:
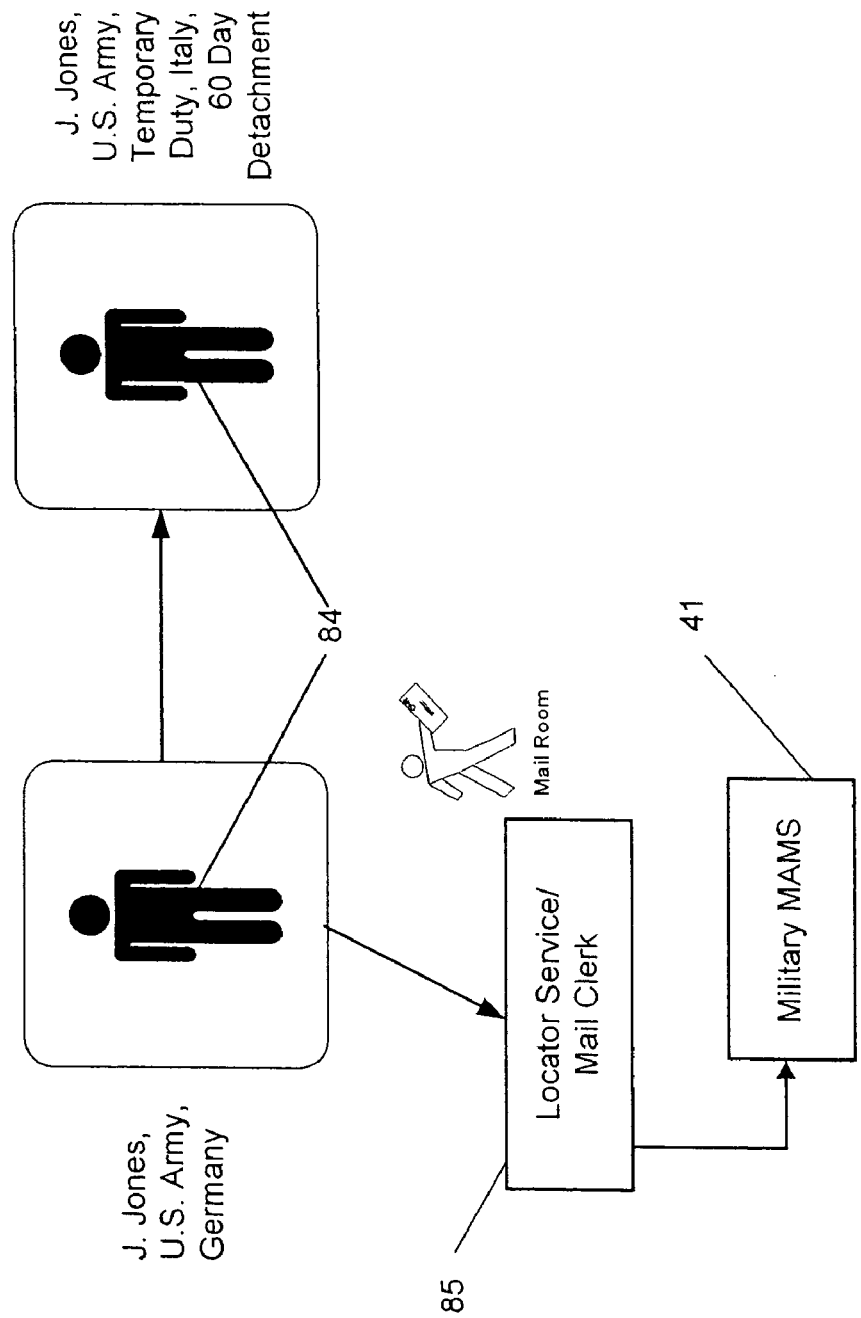

As shown in FIG. 3, Military Change of Address (COA) mail 21, processed on properly equipped MPE machines using sort logic and identified as needing forwarding in decision 22, will have new address labels applied in step 23. Mail is forwarded if the addressee is found to be a qualified COA candidate. The COA condition is determined by the query interface logic 14 in FIG. 2. Examples of forwarding conditions are shown in FIGS. 8-10, and will be explained hereafter. Mail not being forwarded will not have address labels applied. Once the new address label is applied, the mail will be sorted (step 25) to its final delivery point ZIP code consisting of the highest level of detail (greater than 5 digit) and in military unit and member sequence if possible.

Processed mail is prepared for shipment overseas in steps 30 through 33 and sent to the MMPC logistics and distribution division for delivery to the appropriate destination. During this process, the sorted mail is placed in carrier trays and wrapped in plastic (step 30). The trayed mail is then weighed and labeled with shipping information (step 31), scanned into tracking programs and sorted by final destinations (step 32), and then deposited into the proper carrier devices for transportation in step 33 by the appropriate distribution methods (air, land or sea) in step 34.

In an alternative embodiment of the invention, the destination address information in the form of video images 16 in FIG. 2 and any available and associated identification tag information is lifted at the USPS collection sites 1 or 2, and sent via a communications network, such as, a secure Internet communications system, to MMPC 4 for use in further processing by the VCS 17 in FIG. 2. This will eliminate one process step in the MMPC and greatly speed up the mail processing cycle.

Figure 4:
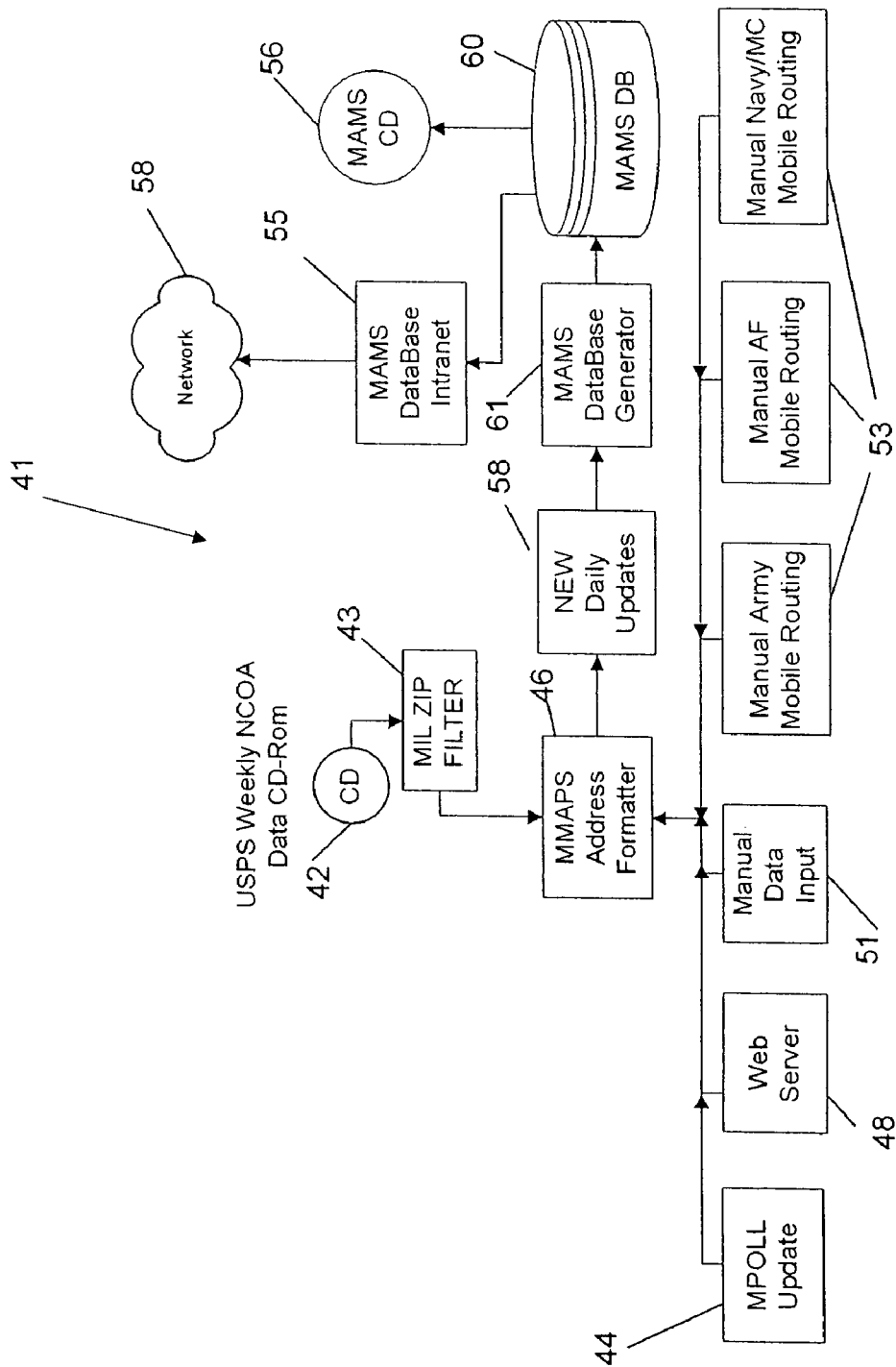
FIG. 4 is a schematic diagram of a Military Address Management System (MAMS) of the invention.

The Military Address Management system (MAMS) 41, as shown in FIG. 4, provides a managed database system. The MAMS master database 60 contains military unit addresses, and names of service members with a change of address. Military addressing is significantly different from normal postal addressing schemes. A typical military unit address and service member naming scheme would be: Captain John P. Jones, USS Theodore Roosevelt, CVN-71, Commanding Officer, FPO, AE, 09599. This requires a new database that contains data elements structured to accommodate a scheme that is different from the accepted Name, Street, City, State, ZIP format. MAMS 41 provides a means for verifying military titles (PFC, private, SFC, Sgt, etc), unit names (DDG41, USS Illinois, etc), postal box codes (PSC, division, etc), and APO, FPO, and ZIP codes. The system also accommodates a service member's family, such as may be found on base housing.

A variety of methods for inputting military COA record information 42, 48, 51, 53 into MAMS master database 60 are shown in FIG. 4. To provide current address information updates, information from the Military Post Office Locator List (MPOLL) 44, a listing of military units and their ZIP codes, and other approved military directory sources such as a military branch address list, are fed into the MMAPS address formatter 46 and processed daily, providing the Unit ZIP file data found in FIG. 5 discussed below. A service member may input a military COA record 48 either by completing a military COA form or electronically using an online form via secure network communications. Authorized military personnel, such as designated unit mail clerks, may input updates 51 to COA records via a secure communications interface to MAMS 41. For example, a unit mail clerk updates MAMS 41 with a service member's new location, or a unit can provide address update information via an automatic entry system for orders given to the unit or its members. All military units that are mobile, which have or anticipate a change of address, submit what are called Mobile Routing Instructions (MRI). These MRIs are used to update these units address in the MAMS. Each military branch also has the option to input mobile routing instructions 53 via a secure network interface to the MAMS database. The USPS NCOA data 42 provides another source of COA information. By filtering this data for military ZIP codes using a data filter 43, the data can be used to update the MAMS database. This is useful, for example, when a service member completes a USPS COA form and submits it to the USPS COA system.

Master database 60 is structured to provide syntax analysis and data element correction. For example, people with identical first and last names may be further identified by using a person's pay grade, or by using the proper military unit name. The database address formatter 46 ensures that the data entered into the database is consistently structured. When a query is made of MAMS database 60 (or any distributed copy of the database), access logic can be used to correct any deficiencies found in a data element on a mail piece. This improves the likelihood that the query will find a proper match in the structured MAMS database 60. Database 60 provides unique delivery point addresses that define specific single units in the military. Master database 60 enables queries to be processed and verified, data matched to database elements, and the address correlated to unique military delivery points.

All daily updates 58 are merged and formatted by the MAMS database generator 61. The output of this generator 61 is the latest version of master database 60 containing the most current military personnel address change records. Database 60 is then distributed and made available to MAMS database servers 12 through a variety of methods, such as optical devices (CD's) 56 or through access to a communications network. In addition, as shown in FIGS. 2 and 4, daily update data 58 is also processed using merge program logic 59 to update fast lookup table 19 on a daily basis, whereas recompiling of database 60 is preferably on a weekly basis. Fast lookup table 19 may be reset each time a new database 60 is generated so that it only contains that has not yet been entered into database 60. Each database 15 represents a copy of master database 60 that has been compiled by merging the contents of CD 56 and any daily updates 58 more recent than CD 56 using a database generator 20 substantially the same as master database generator 61.

Database 15 and table 19 are loaded by the target computer running as server 12 using a disk/memory-caching scheme. This further optimizes the speed of access as well as conservation of physical memory resources. In particular, it allows databases larger then the amount of physical memory of the target systems to be handled efficiently.

Records in master database 60 are preferably layered. This means that multiple updates, separated by time, are maintained "on top" of one of the other and the base data, thus allowing almost unlimited "instant" updates to provide the latest and most accurate information to the automated processing equipment. Reasons for maintaining multiple layers of move data may be, for example, historical record keeping, and making possible corrections to the base data in the event one of the updates later proves incorrect. The layered structure also eliminates the computer- and time-intensive process of creating create a weekly or daily database. The length of time covered and the amount of move data contained by the MAMS database 60 is only limited by the physical resources of MAMS 41.

MAMS 41 could be co-located with an MMPC 4 shown in FIG. 2, or could be located within a site chosen and operated by the military or sub-contractor. It is possible that every MMPC 4 could have an associated MAMS 41, or each MMPC 4 could be linked to a centralized MAMS 41. Maximum usefulness of MAMS 41 will be attained with the centralized use and distribution of the database as described in this example.

Figure 5:
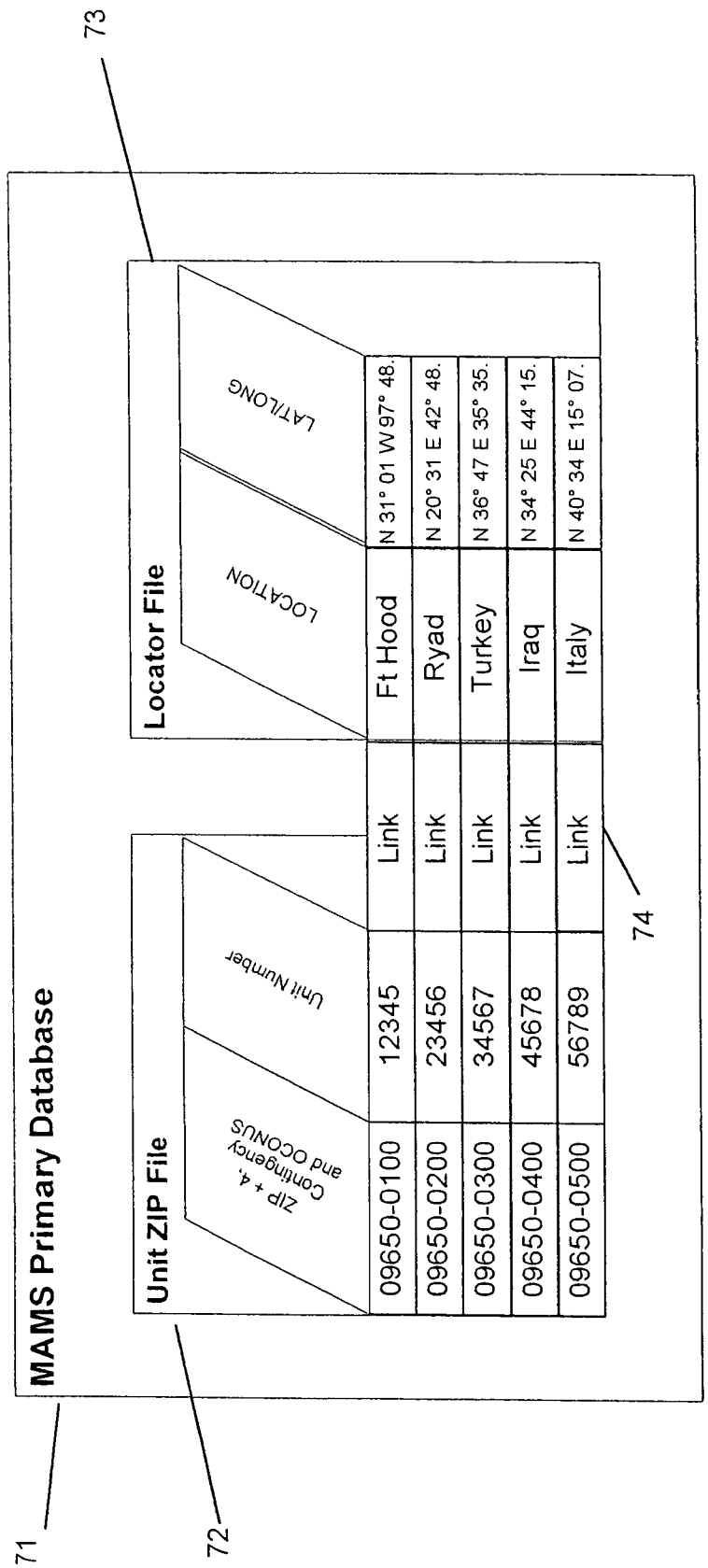
FIG. 5 is a schematic diagram showing an example of a MAMS primary database and the elements therein.

Referring to FIGS. 5 and 6, the MAMS master database 60 consists of two linked database sets, a MAMS primary database (ZIP-Unit) 71 and a Military COA (MCOA) database 76. The information contained in these databases 71, 76 provides a powerful COA locator, by service member, by unit, and by geographical location. The MAMS primary database 71 is comprised of two separate files 72, 73 for security reasons. A unit ZIP file 72 correlates military units with a delivery point ZIP code. A locator file 73 contains record sets associating the military unit of 72 with latitude/longitude coordinates. The MAMS primary database 71 links these files and provides the relationship between a unit, its unique delivery point, and a geographical location. Link 74 can be a simple association between consecutive records (i.e., record 1 of 73 corresponds to record 1 of 72) or may be associations scrambled according to a pattern (record 1 of 73 corresponds to record 311 of 72, for example.) MAMS primary database 71 is based on the fact that all military branches are organized in military units, be they squadrons, platoons, ships, or other, and that all military personnel are assigned to one of these units. Inclusion the military unit information (name, number) on all military addresses is an important factor to the success of this aspect of the invention.

A delivery point is defined as a single unit or company within the military. Hence, a military ZIP code refers to a military unit, not a geographical location. The MAMS primary database 71 is used to sort mail to a physical location. In a typical delivery point sort scheme based on MAMS data, military mail is sorted based on pre-established sort plans. A military sort scheme will sort by location. A given location may have many units, all with different ZIP codes. The existing USPS database does not sort different ZIP codes for the same physical location, but MAMS 41 according to the invention makes this possible. MAMS 41 also enables military sort plans to be updated in real time with the latest location information from the MAMS primary database 71. This is accomplished using a locator sort scheme table that lists all the units and zip codes associated with a location. This table is validated before each use by downloading ZIP code location data from the MAMS primary database 71. Sequencing of the mail within a sort scheme is preferably by units and ZIP codes, e.g., numerically by zip code. Within units, the mail can be sorted first by the 9- or 11-digit ZIP code, then by last name or division, depending upon how well the mail is addressed.

Figure 7:
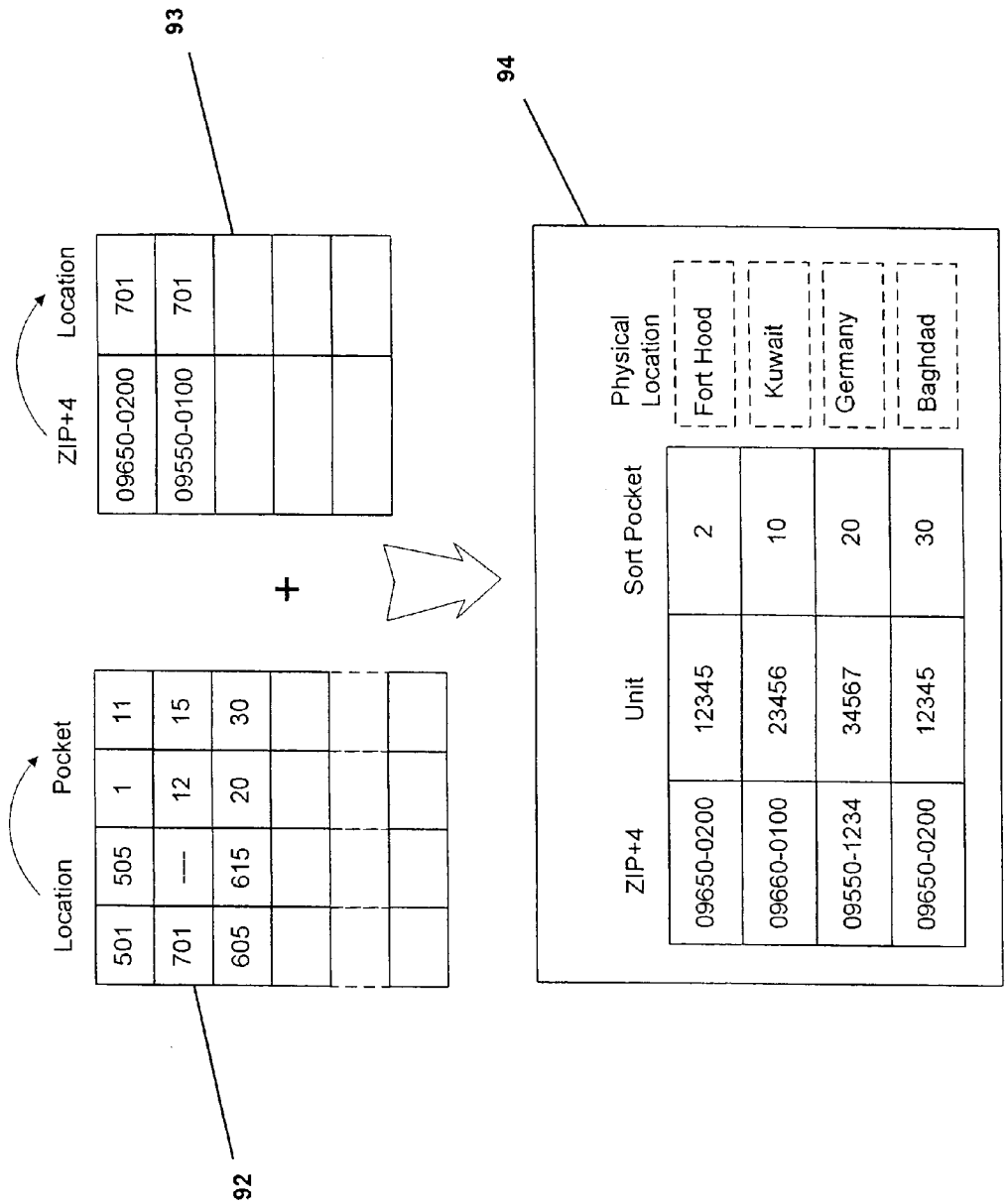
FIG. 7 is a schematic diagram showing an example of tables used to create a sort scheme for military mail according to the invention.

As shown in FIG. 7, locator sort scheme 94 is structured in a table form and lists all the geographical locations and military units for a specific sequence of ZIP codes. The locator sort scheme table is validated before each use by downloading ZIP code location data from the MAMS Primary database. Military sort plans are used by automated mail processing equipment for sorting military mail, but may also be viewed or printed out manually. Each sorting machine is equipped with a sort plan editor. This is used to create specific sort plans based on user needs. Sort plans can be stored locally on a sorting machine, uploaded to a server, or downloaded to a sorting machine from a server.

Two tables are created and then merged to from the sort plan scheme 94. Before a sort plan is used by a sorting machine, the data is verified by comparison to the MAMS database 60. This provides a dynamic sort scheme for each sorter. A sort plan editor first creates two tables 92 and 93. The first table is a list of "locations" and sorter pockets. This is an editable table that can be tailored to a specific set of user conditions. The table 92 in this example is using a system that codes specific geographical locations to numeric entities, for example a country like Germany might contain a sequence of numbered locations in the range 700-799, with each military location referenced to a specific numbered code. The data in table 92 is variable based on the needs of the user and volume of mail. A second table 93 contains unit ZIP codes and location data. The data in table 93 is variable, but the sort plan editor always verifies ZIP code accuracy so that erroneous ZIP codes are not used. The location data in 93 is dynamically retrieved from the MAMS database 60. From these tables, the sort plan editor creates a final sort plan scheme 94. The actual sort plan scheme 94, with resulting data, order and structure, is flexible, and the number of pockets for a ZIP code, ZIP code and pocket order, can be tailored to put units, locations, ZIP Codes in any preferred combination and order.

A second major component of MAMS 41 is the Military Change Of Address (MCOA) database 76 shown in FIG. 6. This database contains personnel location information and is equivalent to the mail locator files typically found at military installations. The requirement for a personnel locator system is found in DOD Postal Manual 4525.6-M. MCOA database 76 computerizes this requirement and links it with the MAMS database 60. Service members or their dependents that have a change of address will have an entry in MCOA database 76 before or soon after they move. This information is stored in MCOA database 76 and is available to MMAPS sorting machines, service branches, and unit mail clerks for the purpose of efficiently delivering mail to the addressee. The information in the MCOA database is name-based. The record data elements are validated for proper naming syntax, proper address structure, correct unit, and associated ZIP code data before entry in the MCOA database, as discussed above.

MAMS database files 72, 73 and 76 contain the raw information to be used to create the binary distributable database 60 that is accessed by the automated equipment. This target-loadable database 60 is compressed and encrypted to ensure the highest level of security as well as speed of access. Lookup tables as described above are generated on the MAMS server 12 to create fast access of updated information as well as to isolate data components within the MCOA database to further enhance security.

Referring now to FIG. 8, mail processed by the MMPC's 4 will automatically have the most current addressee information before it leaves the MMPC site. However, due to the highly mobile nature of the military, mail can still be undeliverable as addressed when it arrives at its destination. This mail can be redirected using the MMAPS operating at a fixed MMPC 4 or from a mobile mail processing center 81. Mobile mail processing center 81 is a more versatile version of the larger MMPC 4 as described in FIG. 2. Mail processing equipment with a small footprint, but capable of the same large MPE performance, is available for this use. In addition, mobile centers 81 would have a MAMS server 12 and a communications network that provides for updates as required. As shown, processing center 81 is preferably incorporated in a large, self-propelled motor vehicle such as a truck, ship or plane, but could also be located in a mobile structure than is not self-propelled, such as a trailer or train car. Mobile sites without networked communications would still be capable of operation using the hard copy media version 56 of the MAMS database 60.

The mail flow example shown in FIG. 7 could be located at a CONUS or OCONUS site. Mail is typically distributed to base or unit mail rooms after arriving from USPS or other MMPC locations. Mail is then sorted and distributed to service members. In the FIG. 7 example, Unit A detachment 5 has recently moved to another location "Way Outback". The mail arriving for Unit A Detachment 5 must therefore be forwarded to the new location. This mail is processed in a fixed or mobile MMPC mail room 81, serving multiple units (e.g., all detachments of Unit A) in a theater of operations 82. This mail processing will locate both individual service members and units as they change addresses. Processed mail is then re-routed for distribution to the addressee using the new location information found in MAMS 41.

FIGS. 9 and 10 provide additional examples of how MMAPS according to the invention can help various intra or in-theater mail flow situations. FIG. 9 shows an individual 84 whose whereabouts are unknown to the responsible unit 85 after a mission was undertaken. This individual 84 is then found and removed to a hospital ship 86. The hospital ship 86 updates the individual's new location in MAMS 41 using secure communications methods. This new information is now available to the service member's unit via electronic notice to the unit 85's mail clerk. The unit's mail clerk can then access MAMS 41 to update and control the delivery of mail to that individual. All mail for that individual anywhere within the MMAPS will automatically be delivered to the correct location (OCONUS or CONUS) for that person, in this case, to the hospital ship 86.

FIG. 10 is an example of a person 84 that has moved to another location under orders. The service member or responsible unit mail clerk 85 enters a change of address into MAMS 41. This addressee information is then available via MAMS 41 to correctly redirect the mail for that service member 84. The redirection of the mail will occur at all MMPC sites 4, including the in-theater MMPC fixed or mobile mail rooms 81. Since COA information has a time stamp, it can be used to set effective dates both for the start and end of military moves. In this example, the service member could have his mail delivered to the temporary duty site for the a specific time period, after which time the mail will be delivered to the original location. In summary, all mail originating in MMPC sites will automatically and correctly (via MAMS) address the individual's mail.

Figure 11:
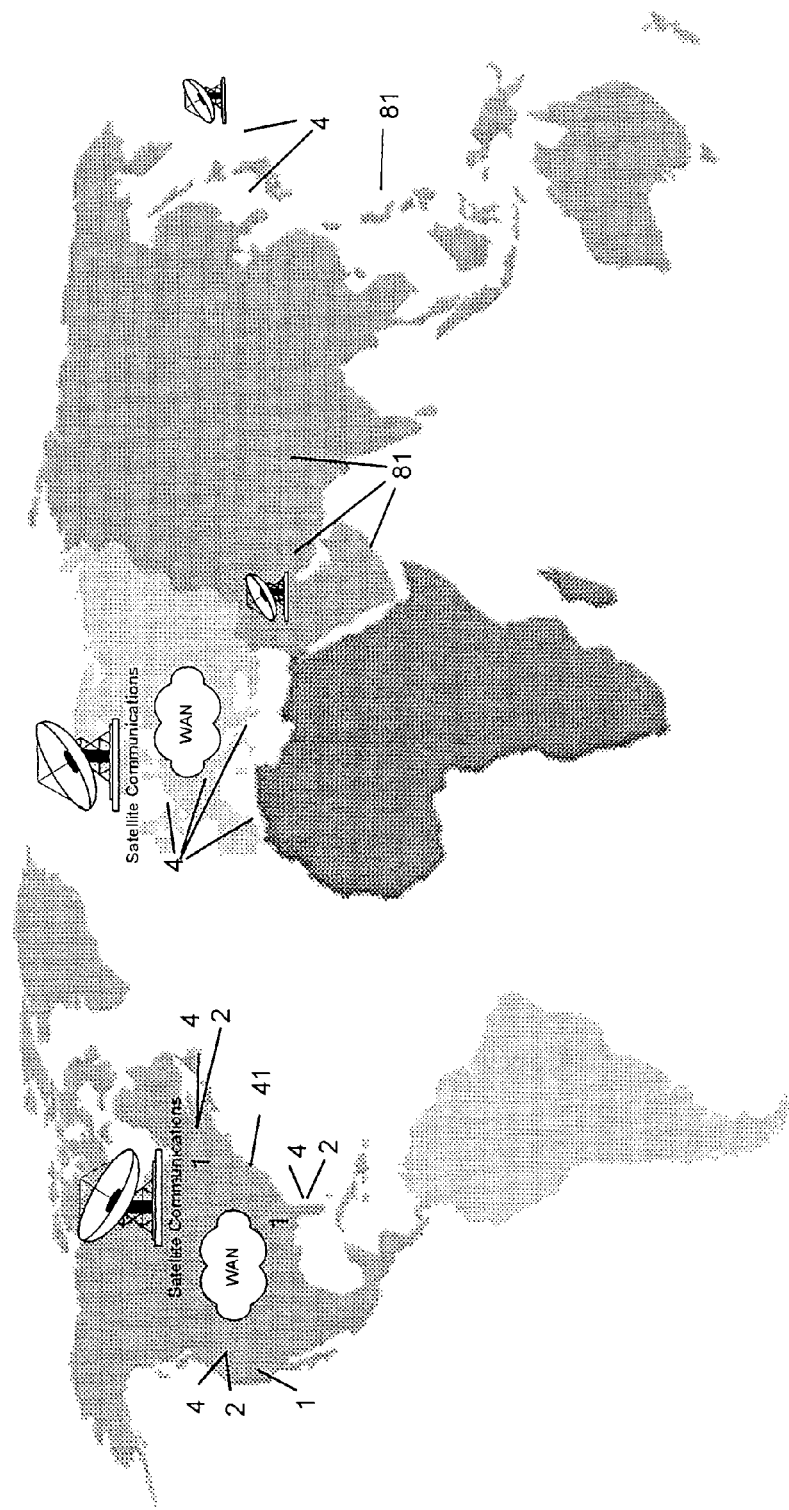
FIG. 11 is a schematic diagram of a MMAPS global organization according to the invention.

FIG. 11 is a schematic representation of the MMAPS network. Mail processed at any USPS site 1 or 2 is transferred to the associated MMPC 4. Forwarding of the mail is accomplished using MAMS 41, which may at be a central location. Mail is transferred to OCONUS processing centers 4 and 81. All military mail can be forwarded around all sites using MAMS information. The MAMS database 41 is distributed world-wide by a variety of methods, such as secure land lines, satellite communications, or by distribution on recordable media such as DVD or CD-ROM. Regardless to the distribution method used, the data is preferably encrypted as previously discussed.

The information system of the invention can be made available for online inspection by authorized military users or non-military subscribers through a secure network. For customers such as military units or service branches desiring to update their records, the invention contemplates receiving an address list from a military branch of service or unit, preparing a revised version of the address list using data corresponding to addresses on the customer's address list from the enhanced databases discussed herein, and then sending the revised address list to the customer.

The foregoing examples admit of many variations. For example, tables or files of required data can be organized as separate databases, or can be combined into a single comprehensive database. The end result is the same and is considered within the scope of the invention. The claims which follow define certain aspects of the invention, but do not limit the invention.

The invention claimed is:

1. A method for distributing military mail, comprising:
    (a) compiling military unit and associated delivery code information into a computer searchable military address management system database which associates a military unit zip code with a current geographic location for that unit;
    (b) obtaining military unit personnel change of address information from sources including a national change of address database maintained by a federal postal service and input from a military unit to which a military mail recipient belongs, which information is compiled into a computer searchable military change of address database, which information includes change of address information more recent than change of address information reflected in a federal national change of address database; and
    (c) using information from the military address management system database and the military change of address database to redirect incorrectly addressed mail pieces to a military mail recipient's current address, which mail pieces include mail that must be redirected due to a change in geographic location of a military unit, wherein step (c) is carried out while sorting mail addressed to military recipients into batches based on military zip codes, whereby incorrectly addressed mail pieces can be redirected without first being delivered to the incorrect address.

2. In a method of for distributing military mail wherein mail addressed to military personnel at addresses outside the United States are received through a federal postal service, delivered by the federal postal service to the military, and then distributed to recipients by the military, wherein the improvement comprises:
    (a) compiling military unit and associated delivery code information into a computer searchable military address management system database which associates a military unit zip code with a current geographic location for that unit;
    (b) obtaining military unit personnel change of address information from sources including a national change of address database maintained by a federal postal service and input from a military unit to which a military mail recipient belongs, which information is compiled into a computer searchable military change of address database, which information includes change of address information more recent than change of address information reflected in a federal national change of address database;

(c) sorting mail addressed to military recipients into batches based on military zip codes; and (d) redirecting incorrectly addressed mail pieces to a military mail recipient's current address using information from the military address management system database and the military change of address database, which mail pieces include mail that must be redirected due to a change in geographic location of a military unit, wherein the sorting and redirecting steps occur prior to delivery of the mail pieces by the federal postal service to the military and without first being delivered to the incorrect address.

3. The method of claim 2, wherein the federal national change of address database is the USPS NCOA database.

4. The method of claim 2, wherein step (b) comprises receiving change of address information through a network.

5. The method of claim 2, further comprising a step (e) of distributing information from the military address management system database and the military change of address database to users.

6. The method of claim 5, further comprising allowing online access to information from the military address management system database and the military change of address database to users through a secure network.

7. The method of claim 5, wherein step (e) further comprises:

receiving an address list from a customer;

preparing a revised version of the address list using data corresponding to addresses on the customer's address list from the military address management system database and the military change of address database enhanced database; and sending the revised address list to the customer.

8. The method of claim 2, wherein the mail redirected in step (d) includes mail for distribution to military personnel outside the United States.

9. The method of claim 2, wherein a service member user inputs a military change of address record using an online form via a secure network.

* * * * *